(12) United States Patent
Wycech

(10) Patent No.: US 7,211,321 B2
(45) Date of Patent: *May 1, 2007

(54) REINFORCEMENT LAMINATE

(75) Inventor: Joseph S. Wycech, Grosse Pointe Shores, MI (US)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 55 days.

This patent is subject to a terminal disclaimer.

(21) Appl. No.: 10/026,501

(22) Filed: Dec. 19, 2001

(65) Prior Publication Data

US 2002/0054988 A1 May 9, 2002

Related U.S. Application Data

(62) Division of application No. 09/273,107, filed on Mar. 19, 1999, now Pat. No. 6,372,334.

(60) Provisional application No. 60/090,011, filed on Jun. 19, 1998, provisional application No. 60/080,014, filed on Mar. 30, 1998.

(51) Int. Cl.
B32B 3/26 (2006.01)
B32B 3/10 (2006.01)

(52) U.S. Cl. .................. 428/316.6; 428/158; 428/177; 428/218; 428/317.1; 428/317.9; 428/319.1; 428/319.3; 428/131

(58) Field of Classification Search ............... 428/177, 428/218, 316.6, 317.1, 319.1, 158, 192, 131, 428/156, 157, 162
See application file for complete search history.

(56) References Cited

U.S. PATENT DOCUMENTS

| | | | |
|---|---|---|---|
| 3,640,836 A | 2/1972 | Oberst et al. | |
| 3,833,404 A | 9/1974 | Sperling et al. | |
| 3,919,443 A | 11/1975 | Porter | |
| 3,953,067 A * | 4/1976 | Isola | 296/214 |
| 4,042,746 A | 8/1977 | Hofer | |
| 4,128,683 A * | 12/1978 | Nomura et al. | 428/138 |
| 4,211,590 A * | 7/1980 | Steward et al. | 156/79 |
| 4,234,907 A * | 11/1980 | Daniel | 362/556 |
| 4,399,174 A | 8/1983 | Tanaka et al. | |
| 4,901,500 A * | 2/1990 | Wycech | 52/735.1 |
| 5,073,429 A | 12/1991 | Steinke et al. | |
| 5,215,796 A * | 6/1993 | Mueller et al. | 428/36.5 |
| 5,260,097 A * | 11/1993 | Silvestre | 427/282 |
| 5,456,976 A * | 10/1995 | LaMarca et al. | 442/221 |
| 5,575,526 A * | 11/1996 | Wycech | 296/205 |
| 5,695,867 A | 12/1997 | Saitoh et al. | |

(Continued)

FOREIGN PATENT DOCUMENTS

BE 882.163 1/1980

(Continued)

*Primary Examiner*—Hai Vo
(74) *Attorney, Agent, or Firm*—Stephen D. Harper; Harold Pezzner

(57) ABSTRACT

A tri-laminate body panel stiffener includes two polymer layers with or without a backing. One of the layers is a compliant foam layer mounted against a substrate while the other layer is a rigid foam layer mounted against the compliant foam layer. In another aspect of the invention the laminate comprises a backing member having an expandable foam mounted thereto with two or more opposing edges of the laminate being of non-straight construction such as being wavy or saw tooth. A pattern of holes may be formed through the foam and backing layers.

29 Claims, 3 Drawing Sheets

U.S. PATENT DOCUMENTS

| | | | | |
|---|---|---|---|---|
| 5,861,202 A | * | 1/1999 | Kimura et al. | 428/105 |
| 5,866,052 A | * | 2/1999 | Muramatsu | 264/46.6 |
| 5,888,600 A | * | 3/1999 | Wycech | 428/35.9 |
| 6,027,798 A | * | 2/2000 | Childress | 428/319.3 |
| 6,372,334 B1 | * | 4/2002 | Wycech | 428/316.6 |

FOREIGN PATENT DOCUMENTS

| | | | |
|---|---|---|---|
| EP | 0 060 561 | | 9/1982 |
| EP | 0 893 331 | | 1/1999 |
| JP | 08169076 A | * | 7/1996 |

* cited by examiner

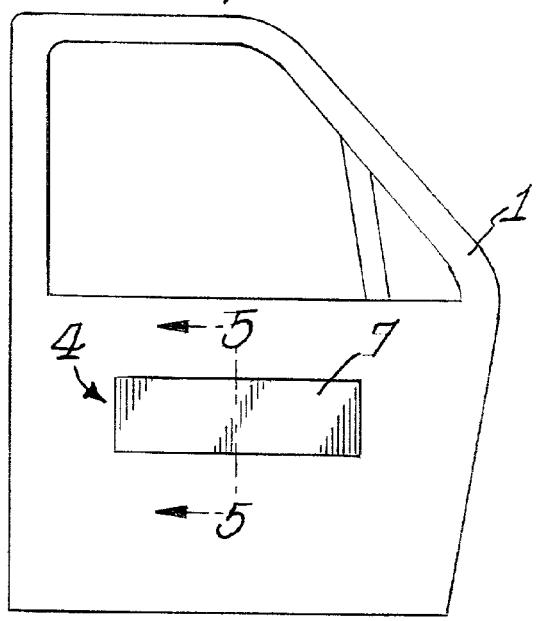
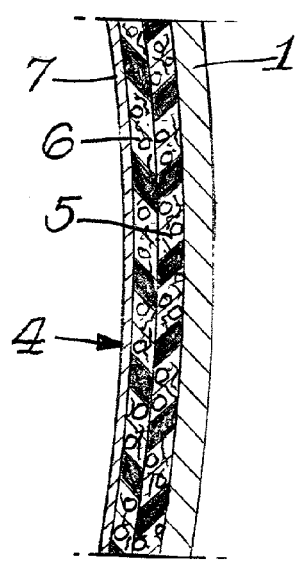
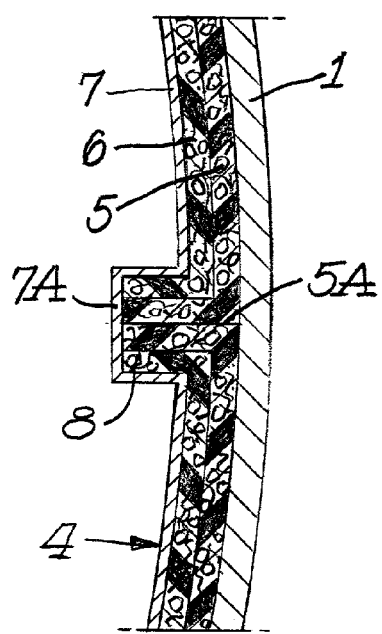
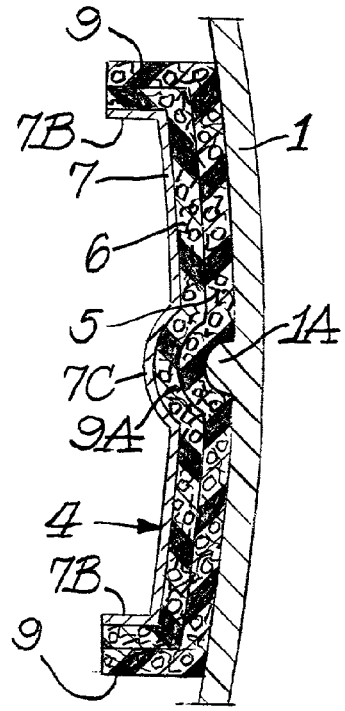

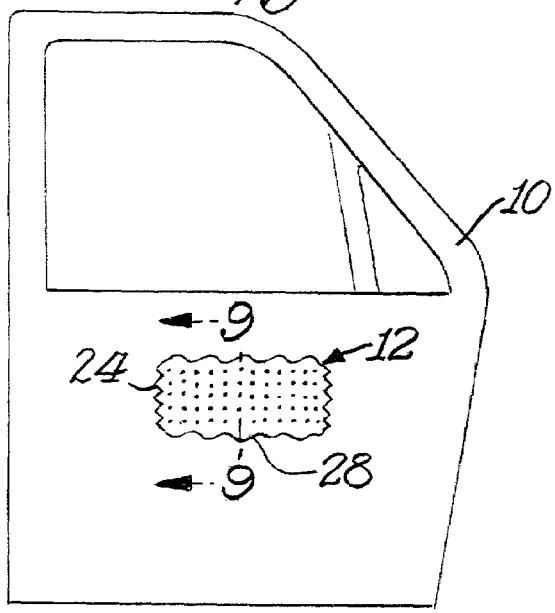
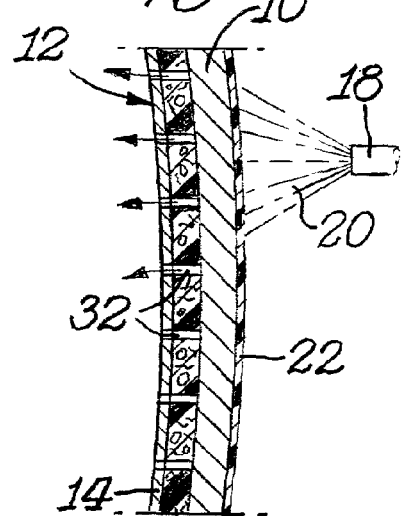
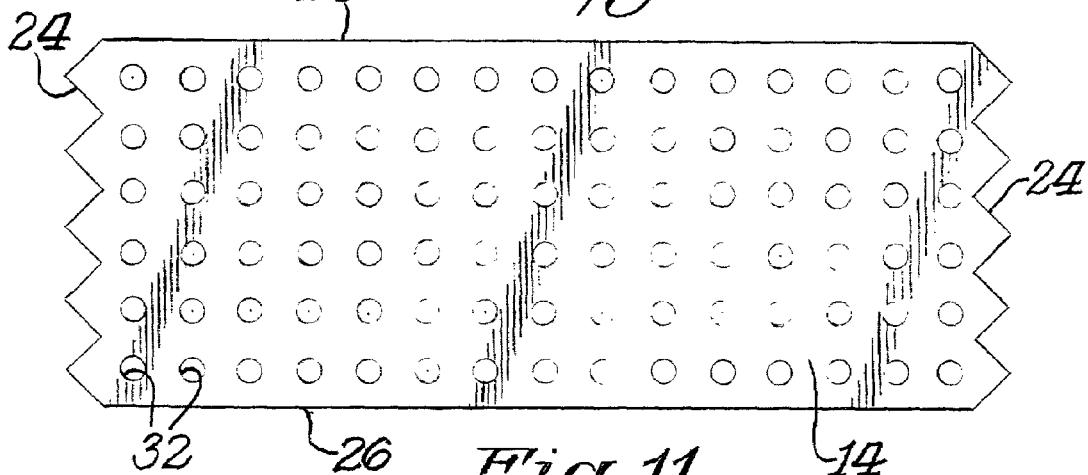
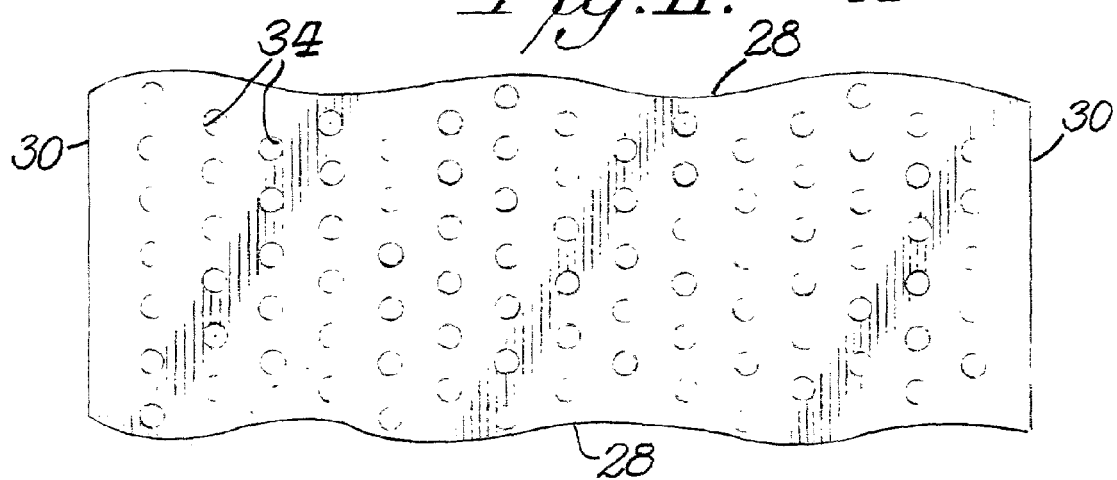

REINFORCEMENT LAMINATE

CROSS-REFERENCE TO RELATED APPLICATIONS

This application is a divisional application of Ser. No. 09/273,107, filed, Mar. 19, 1999, now U.S. Pat. No. 6,372,334, which is based upon provisional application Ser. No. 60/080,014, filed Mar. 30, 1998, and provisional application Ser. No. 60/090,011, filed Jun. 19, 1998.

BACKGROUND OF THE INVENTION

The conventional practice to stiffen outer automotive body panels is with a sheet thermoset polymer placed on the inside of a panel and then heat cured in a paint oven. The conventional heat cured stiffener is applied as a wallpaper sheet type applique or as a sprayed on layer. The applique is provided in a single or double layer sheet. The main layer is a thermoset layer with or without a backing. Where a backing is used, the backing can be fiberglass cloth, metal screen, or foil. The spray on is a single polymer layer without a backing. The polymer layer is generally 0.020 to 0.100 inches thick.

In the automotive industry when the vehicle doors are painted during heat cure there is a problem with paint read through due to the heat curing of the outer metal body panel stiffener and the expansion and contraction of the metal outer panel during the paint bake cycle. It would be desirable if some techniques could be provided to eliminate or reduce the paint read through problem.

SUMMARY OF THE INVENTION

An object of this invention is to provide a body panel stiffener which improves upon the conventional practices.

A further object of this invention is to eliminate paint shadowing or metal distortion by reducing the cure shrinkage strains during the polymer cure and metal panel curing.

A still further object of this invention is to provide such techniques which are particularly adaptable for the automotive industry.

In accordance with one aspect of this invention a laminate body panel reinforcement or stiffener is provided which includes two polymer layers mounted against a substrate with or without a backing. Preferably, one of the polymer layers is a compliant foam which would be disposed directly against the substrate or structural member being reinforced. An outer or rigid foam layer is secured to the other side of the compliant foam layer and a carrier, such as a foil or fibreglass backing is secured to the outer surface of the rigid foam layer.

In accordance with another aspect of this invention the reinforcing laminate for a part or substrate is made from a stiffener member or backing having an expandable foam secured thereto. In accordance with the invention read through is controlled by various alternative techniques. For example, the read through can be controlled by having no parallel longitudinal edges. This can be achieved by having either wavy and/or saw tooth conditions on two and/or four opposing edges. A further technique to control read through would be by the material polymer thickness and by punching or forming holes through all the polymer and backing layers. The hole pattern can be ordered or uniform or can be in a staggered or a random display.

BRIEF DESCRIPTION OF THE DRAWINGS

FIG. 4 is a perspective view showing the stiffener of FIG. 3 used for automobile door application;

FIGS. 5–7 are cross-sectional views of various configurations based on the section A—A of FIG. 4;

FIG. 8 is a side elevational view showing the inside of a vehicle door having a reinforcement laminate mounted thereto in accordance with a further aspect of this invention;

FIG. 9 is a cross-sectional view taken through FIG. 8 along the line 9—9;

FIG. 10 is a front elevational view of one form of reinforcement laminate; and FIG. 11 is a view similar to FIG. 10 of a modified form of reinforcement laminate.

DETAILED DESCRIPTION

Figure 1:
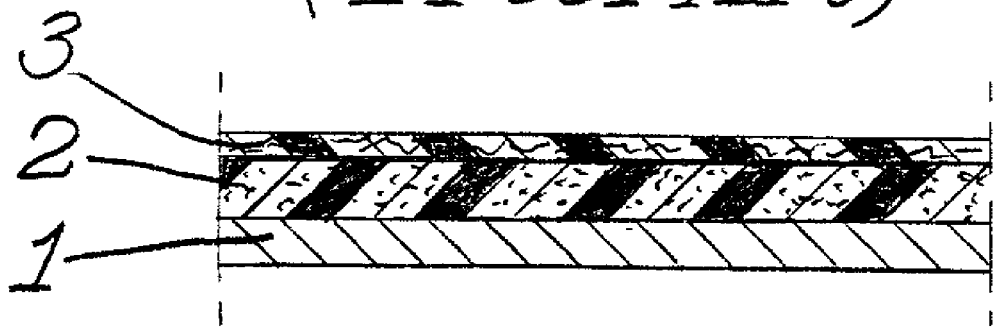
FIGS. 1 and 2 are cross-sectional views in elevation of prior art stiffeners.
Figure 2:
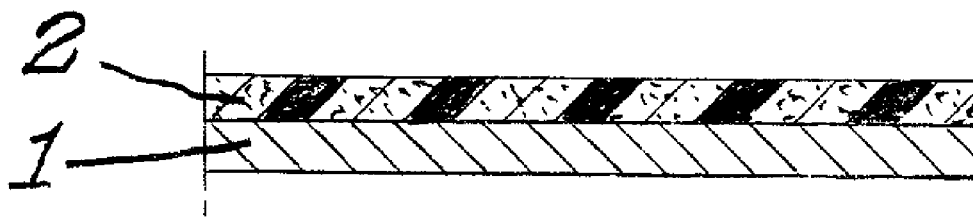

FIGS. 1–2 illustrate conventional practices for stiffening outer automotive body panels. As shown therein a metal substrate 1 is provided on which a polymer 2 is attached. The application of the polymer 2 which can be a sheet thermoset polymer can be by using a wallpaper sheet type technique as shown in FIG. 1 or can be sprayed on as shown in FIG. 2. In the practice shown in FIG. 1 a fiberglass backing 3 covers the polymer 2. After the polymer 2 is applied it is then heat cured in an oven. Where a wallpaper sheet type applique is used, a single or double layer sheet may be applied. The main layer would be a thermoset layer with or without a backing. In the alternative of FIG. 2 a single polymer layer is applied without a backing. Where a backing is used the backing can be fiberglass cloth, metal screen, or foil. Generally, the polymer layer would have a thickness of 0.020 to 0.100 inches thick.

The conventional panel stiffeners such as shown in FIGS. 1 and 2 shrink when they cure. Because of their good adhesion, the cure shrinkage strains are fed into the substrate 1 to which the stiffener is bonded. Consequently, paint on the opposite face of substrate 1 would be patterned according to the induced strains in the substrate.

Figure 3:
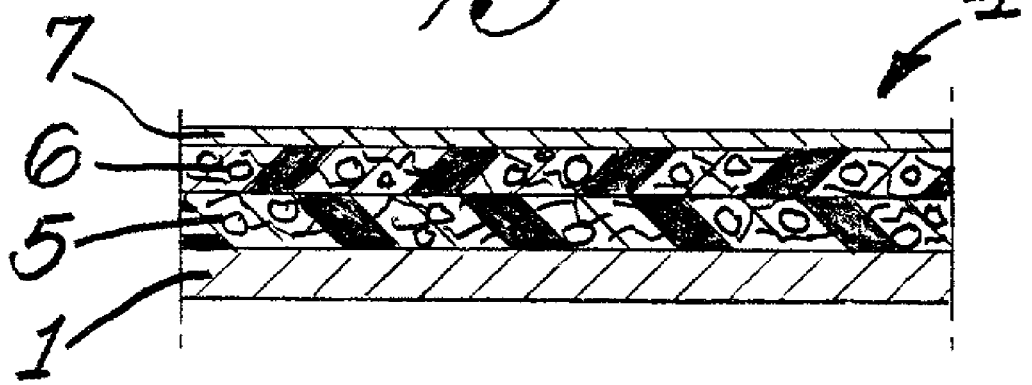
FIG. 3 is a cross-sectional view in elevation of a tri-laminate body panel stiffener in accordance with this invention.

FIG. 3 illustrates a stiffener 4 in accordance with this invention. As shown therein a compliant foam layer 5 is applied directly against the panel or metal substrate 1. A rigid foam layer 6 is applied against the compliant foam layer 5. FIG. 3 also illustrates a foil or fiberglass backing or carrier 7 on the outer surface of rigid foam layer 6. This results in a tri-laminate body panel stiffener 4.

When the tri-laminate stiffener 4 cures'the first intimate layer 5 can not transfer shrinkage strains to the substrate 1 and layer 5 cannot restrain the outer metal panel from shrinking when the panel comes out of the oven because it is not rigid after cure. The second layer 6 is rigid after cure but its shrinkage strain are blocked from getting to the substrate by the compliant first layer. The backing or carrier 7 is used to provide additional stiffness.

The compliant foam layer 5 absorbs shrinkage strains due to the cure of the heat curable layers. Large shrinkage strains of the rigid layer 6 are not fed in the metal substrate 1 but yet the rigid layer 6 with its backing 7 will stiffen the panel. A typical layer thicknesses are from 1–1.5 mm for compliant layer 5 and 1–2.0 inches for rigid layer 6 with backing layer 7 having a thickness of 0.002–0.004 inch. Any suitable materials may be used for layers 5 and 6. Both polymer layers should be compatible in chemistry, however, otherwise the cured finished product of either layer will be compromised. Reference is made to my U.S. Pat. No. 5,575,526 and my application Ser. No. 09/099,025, filed Jun. 17, 1998, all of the details of which the patent and application and incorporated herein by reference thereto. The patent and application disclose suitable materials which may be used for the foam layer to create a rigid structural foam and materials for the carrier. The specific materials are not critical provided they function in the intended manner, namely, in that the layer 5 would be compliant while the layer 6 would have rigidity. Compliant layer 5 may have rubber-like characteristics such as materials conventionally used for refrigerator door seals or automobile door strips. Layer 5 may be tacky or non-tacky.

As disclosed in U.S. Pat. No. 5,575,526 a suitable rigid structural foam would be made from a material comprising 35–95% by weight synthetic resin or preferably 75–94% by weight or more preferably 78–90% by weight and 1–60% by weight cell forming agent or preferably 1–35% or more preferably 3–20% and 1–55% by weight filler or preferably 5–24% or more preferably 7–19%.

FIG. 4 illustrates the foil back laminate 4 of this invention as used for automobile door application. FIGS. 5–7 illustrate in cross-section different possible configurations for such applications. As is apparent from FIGS. 3 and 5, the tri-polymer layer stiffener 4 may be of uniform thickness with flat planar layers as illustrated in FIG. 3.

FIG. 5, however, illustrates a door panel 1 to have a shallow curve configuration. The patch or stiffener 4 would conform to that configuration. FIG. 5 shows the stiffener 4 to have uniform thickness. FIGS. 6–7, however, show variations which could be incorporated which would require non-uniform thickness. As shown, the foil backing or carrier 7 includes an outer channel section 7A forming a rib or bead in combination with the extended portion 8 of the foam layers 5,6. The foam layers 5,6 could be provided as two separate pairs of sheets which abut against each other in the channel section 7A. For example, FIG. 6 shows the two foam layers 5 to abut each other at surface 5A. Foil backing 7 may also be made of two layers which abut at the center of channel 7A.

FIG. 7 shows end extensions or flanges 7B for the foil backing 7 with conforming end flanges 9 for the pair of foam layers 5,6 in combination with a central extension 7C of the foil backing 7 and a central extension 9A of the foam layers 5,6 to accommodate a rib 1A on the panel 1. The provision of these outward extensions results in rib sections that offer even more panel stiffening than a completely flat and/or uniform laminate because of the increase in section and redistribution of the foil backed laminate reinforcement away from the panel neutral axis. Thus, FIGS. 6-7 illustrate the stiffener 4 to include stiffening beads while FIG. 7 also includes stiffening end flanges.

As shown in FIGS. 3 and 5–7 the laminate has an outer surface at its carrier layer 7 which over substantially its entire area is a smooth continuous contour which is illustrated as flat (FIG. 3) or a curved contour (FIGS. 5–7). FIGS. 6–7 illustrate the outwardly extending rib or bead to form a minor interruption to the contour. FIG. 7 illustrates the layers to include outwardly extending end walls.

FIGS. 8–11 relate to another aspect of this invention which is intended to address problems relating to paint read through which cause shadowing or metal distortion. The techniques involved in FIGS. 8–11 may be used in combination with the tri-laminate structure of FIGS. 3–7 or may be used separately from those features.

In general, the invention illustrated in FIGS. 8–11 includes providing a laminate stiffener or reinforcement laminate for a part or substrate. The materials of the laminate and of the substrate to which it would be applied and the uses of the invention may be those discussed with respect to FIGS. 3–7.

As shown in FIGS. 8–9 the part or substrate 10 being reinforced is a vehicle door. A reinforcement laminate 12 is mounted to the door preferably at generally the central area of the door. The laminate may be of any suitable size and shape. In the preferred embodiment the laminate is of generally rectangular shape having certain modifications which will be later discussed. Laminate 12 comprises a backing 14 and an intimately bonded expandable foam layer 16. Foam layer 16 may be a single rigid structural foam layer such as in my previously noted patent and application or may be of two layer form as illustrated, for example, in FIG. 3. Layer 16 is disposed against the substrate 10. Where the invention is used in the automotive industry FIG. 9 schematically shows a paint spray nozzle 18 applying a pattern of paint 20 to create a paint layer 22 on the substrate 10. Where part 10 is in a paint oven in which the polymer 16 cures, there might be a problem with paint read through of the heat cured outer metal panel body stiffeners. The present invention provides various techniques for eliminating or reducing such paint read through.

FIG. 10 illustrates one practice of the invention where the laminate has a pair of longitudinal side edges 26, 26 interconnected by a pair of transverse end edges 24, 24. As shown therein the opposed end edges 24, 24 are of non-straight linear configuration forming hills and valleys. Specifically, in the embodiment illustrated in FIG. 10 the edges 24, 24 are of saw tooth construction. Intermediate edges 26, 26 are illustrated as being straight edges parallel to each other. It is to be understood, however, that edges 26, 26 may also be of non-straight shape such as having saw-tooth construction so that all four edges have peaks and valleys. Alternatively, edges 26, 26 may have the saw tooth construction and edges 24, 24 may be straight parallel edges.

FIG. 11 illustrates a variation wherein the longitudinal edges 28, 28 have peaks and valleys by being undulated or wavy. The intermediate edges 30, 30 are illustrated as being straight and parallel. The invention, however, may be similarly practiced where edges 30, 30 are also of wavy construction similar to edges 28, 28 or where the wavy construction is on edges 30, 30; but edges 28, 28 are straight and parallel.

FIG. 8 illustrates the further possibility of saw-tooth edges 24 and wavy edges 28. Thus, any arrangement of creating peaks and valleys may be used within the broad practices of this invention including different forms of structure to achieve the peaks and valleys along different edges.

In accordance with a further practice of the invention read through is controlled by the material polymer thickness and by punching or otherwise forming holes through all of the polymer and backing layers. FIG. 10, for example, shows a pattern of holes 32 in a uniform or ordered array where all of the holes are arranged in straight rows and columns in line with each other. FIG. 11, however, shows the holes 34 to be in straight rows and columns which are staggered. The invention may also be practiced where the holes are in a random pattern, rather than straight rows and columns.

Where holes are provided through the laminate 12, the laminate may optionally include the non-straight edges such as the saw tooth and wavy formations or optionally the laminate could have some or all of the edges straight.

As illustrated in FIGS. 8–11 and particularly in FIG. 9, the aligned holes 32 in each layer form a passageway having a straight continuous longitudinal axis. The passageway is shown to be of uniform diameter throughout its length. As illustrated each hole in layer 16 is aligned with a hole in layer 14.

The invention may be practiced by forming the backing layer 14 of the desired shape which includes the non-straight edges. The polymer or unexpanded foam may then be coated on or otherwise applied to the entire surface of backing 14 to form the laminate 12. The laminate 12 would then be mounted to substrate 10 by positioning the polymer layer 16 against the substrate 10. When the polymer is activated, the foam expands and would move backing layer 14 outwardly further away from substrate 10. The foam would also expand outwardly beyond the edges of backing 14. The various techniques used for practicing the invention would result in reducing or eliminating paint shadowing or metal distortion by reducing shrinkage strains during the polymer cure. While the invention is preferably practiced with a heat expandable polymer the invention may also be practiced with other types of expandable polymers, such as chemically activated as in the above noted application.

Although the invention has been particularly described with respect to its preferred use for reinforcing vehicle doors the concept of the invention may be applied for reinforcing other parts. For example, the invention may be used for roofs, deck lids and fenders of vehicles. The invention may also be used for reinforcing non-vehicle parts. Similarly, while the invention is preferably practiced for supporting a metal substrate, other substrates may be used as disclosed in the above noted applications. The backing 14 is preferably a thin metal foil such as an aluminum foil. The invention may be practiced, however, with other backing materials such as described in the above noted applications.

The provision of the various techniques for controlling paint through may be incorporated in stiffening reinforcements which include the added features of the above noted applications or which are simply part of a basic structure comprising a backing and foam laminate.

The various features described in detail herein may be used in combination with each other or separately from each other and may also be used in combination with the features described in my co-pending application Ser. No. 09/099,025.

What is claimed is:

1. A reinforcement laminate for reinforcing a substrate comprising a carrier layer, said carried layer being made of a material selected from the group consisting of fiberglass cloth, metal screen and foil, a first layer of foamable material capable upon activation of becoming a rigid reinforcement foam secured to said carrier layer, a second layer of foamable material capable upon activation of becoming a compliant foam secured to said first foamable layer, said second foamable layer comprising a bonding layer for securing said laminate to a substrate, said first foamable layer and said second foamable layer being heat cured and foamed in-situ, said second foamable layer upon activation becoming a foam layer capable of absorbing shrinkage strains due to heat cure of said second foamable layer and cooling of the substrate, and including a pattern of holes creating open passageways completely through said laminate.

2. The laminate of claim 1 wherein said carrier layer is a foil backing.

3. The laminate of claim 1 in combination with said substrate, and said second layer being intimately bonded directly to said substrate.

4. The laminate of claim 3 wherein said first and second layers and said carrier layer have a generally continuous contour, and at least one rib formed by said first and second layers and said carrier layer forming a minor interruption of said continuous contour.

5. The laminate of claim 4 wherein said substrate includes a rib in line with said rib of said foamable layers and said carrier layer.

6. The laminate of claim 5 wherein said first and second layers and said carrier layer include end flanges extending in the same direction as each other and as said rib away from said continuous contour.

7. The laminate of claim 3 wherein said substrate is a vehicle part selected from the group consisting of a door, a roof, a deck lid and a fender.

8. The laminate of claim 3 wherein said substrate is a vehicle part.

9. The laminate of claim 1 wherein said laminate in its elevation view has a pair of longitudinal side edges interconnected by a pair of transverse end edges and at least one of said pair of side edges and said pair of end edges is of non-straight and undulated shape.

10. The laminate of claim 9 wherein said undulated shape has a pattern of hills and valleys joined together in a smooth wavy pattern.

11. The laminate of claim 9 wherein said undulated shape has a pattern of hills and valleys in a sawtooth shape.

12. The laminate of claim 9 wherein said non-straight and undulated edges are said side edges.

13. The laminate of claim 9 wherein said non-straight and undulated edges are said end edges.

14. The laminate of claim 13 wherein said side edges are also non-straight and undulated.

15. The laminate of claim 9 in combination with said substrate, and said second layer being a compliant foam layer intimately bonded to said substrate.

16. The laminate of claim 15 wherein said substrate is a vehicle door.

17. The laminate of claim 1 wherein said pattern of holes comprises a plurality of uniformly and equally spaced aligned rows and columns of holes.

18. The laminate of claim 1 wherein said pattern of holes comprises a plurality of holes arranged in staggered rows and columns.

19. The laminate of claim 1 wherein said pattern of holes is randomly arranged.

20. The laminate of claim 1 wherein said first layer and said second layer are in direct contact with each other.

21. The laminate of claim 1 wherein said first layer and said second layer are made of different foamable materials.

22. The laminate of claim 1 wherein said first layer is made of a material comprising 35–95% by weight synthetic resin, 1–60% by weight cell forming agent and 1–55% by weight filler.

23. A reinforcement laminate for reinforcing a substrate comprising a carrier layer, a first layer of foamable material capable upon activation of becoming a rigid reinforcement foam secured to said carrier layer, said first layer being made of a material comprising 35–95% by weight synthetic resin, 1–60% by weight cell forming agent and 1–55% by weight filler, a second layer of foamable material capable upon activation of becoming a compliant foam secured to said first foamable layer, said second foamable layer comprising a bonding layer for securing said laminate to a substrate, said first foamable layer and said second foamable layer being heat cured and foamed in-situ, said second foamable layer upon activation becoming a foam layer capable of absorbing shrinkage strains due to heat cure of said second foamable layer and cooling of the substrate, and including a pattern of holes creating open passageways completely through said laminate.

24. The laminate of claim 23 wherein said carrier layer is made from a material selected from the group consisting of fiberglass cloth, metal screen and foil.

25. A reinforced structure comprising a carrier layer, a layer of rigid reinforcement foam secured directly to said carrier layer, a layer of compliant foam secured directly to said rigid foam, said layer of compliant foam comprising a bonding layer securing said laminate to a substrate, said rigid foam layer and said compliant foam layer being heat curable, said compliant foam layer functioning for absorbing shrinkage strains due to heat cure of said foam layer and cooling of said substrate, said substrate being a vehicle door, said compliant foam layer being mounted to said vehicle door, and including a pattern of holes creating open passageways completely through said laminate.

26. The structure of claim 25 wherein said foam layers and said carrier layer have a generally continuous contour, and at least one rib formed by said foam layers and said carrier layer forming a minor interruption of said continuous contour.

27. The structure of claim 26 wherein said foam layers and said carrier layer include end flanges.

28. The structure of claim 25 wherein said laminate in its elevation view has a pair of longitudinal side edges interconnected by a pair of transverse end edges, and at least one of said pair of side edges and said pair of end edges being of non-straight and undulated shape.

29. The structure of claim 25 wherein said compliant foam layer is mounted at generally the central area of said vehicle door.

* * * * *